United States Patent
Miao et al.

(10) Patent No.: US 11,832,183 B2
(45) Date of Patent: **\*Nov. 28, 2023**

(54) WAKE-UP SIGNAL DESIGN

(71) Applicant: APPLE INC., Cupertino, CA (US)

(72) Inventors: Honglei Miao, Munich (DE); Hong He, San Jose, CA (US); Grigory Ermolaev, Nizhny Novgorod (RU); Toufiqul Islam, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,099

(22) Filed: Sep. 24, 2022

(65) Prior Publication Data

US 2023/0016739 A1 Jan. 19, 2023

Related U.S. Application Data

(63) Continuation of application No. 17/285,408, filed as application No. PCT/US2019/056146 on Oct. 14, 2019, now Pat. No. 11,503,546.

(Continued)

(51) Int. Cl.
*H04W 52/02* (2009.01)
*H04J 13/00* (2011.01)

(52) U.S. Cl.
CPC ..... *H04W 52/0232* (2013.01); *H04J 13/0029* (2013.01); *H04J 13/0062* (2013.01); *H04W 52/0235* (2013.01)

(58) Field of Classification Search
CPC ... H04W 76/28; H04W 4/70; H04W 52/0232; H04W 52/0235; H04W 52/0212;

(Continued)

(56) References Cited

U.S. PATENT DOCUMENTS

2017/0013553 A1 1/2017 Huang et al.
2017/0064571 A1\* 3/2017 Kusashima ........... H04W 48/16
(Continued)

FOREIGN PATENT DOCUMENTS

WO 2017003336 A1 1/2017
WO 2017052596 A1 3/2017
(Continued)

OTHER PUBLICATIONS

U.S. Appl. No. 17/285,408, Notice of Allowance, dated Sep. 23, 2022, 10 pages.

(Continued)

*Primary Examiner* — Chi H Pham
*Assistant Examiner* — Vladislav Y Agureyev
(74) *Attorney, Agent, or Firm* — Dorsey & Whitney LLP

(57) ABSTRACT

Technology is disclosed for a user equipment (UE) operable for wake-up signal (WUS) communication in a fifth generation (5G) new radio (NR) network. The UE can be configured to: identify a resource set for a WUS with a repetition level, wherein: the resource set for the WUS includes a mapping of the WUS that associates the WUS with one or more physical resource blocks and one or more orthogonal frequency division multiplexing (OFDM) symbols, and the repetition level identifies a number of base sequences for the WUS in the resource set; and switch to a network access mode (NAM) from a power saving mode (PSM) based on a detection of the WUS in the resource set.

20 Claims, 11 Drawing Sheets

Related U.S. Application Data

(60) Provisional application No. 62/747,006, filed on Oct. 17, 2018.

(58) Field of Classification Search
CPC ......... H04W 52/0216; H04W 52/0229; H04W 52/0274; H04W 52/0048; H04W 48/12; H04L 5/0007; H04L 5/001; H04L 5/005; H04L 5/0053; H04L 5/0094; H04J 2211/005; H04J 13/0029; H04J 13/0062; Y02D 30/70
See application file for complete search history.

(56) References Cited

U.S. PATENT DOCUMENTS

| | | | |
|---|---|---|---|
| 2017/0070312 A1* | 3/2017 | Yi | H04W 72/541 |
| 2017/0135093 A1 | 5/2017 | Kim et al. | |
| 2017/0286255 A1* | 10/2017 | Kinnear | G06F 9/45504 |
| 2018/0054790 A1 | 2/2018 | Islam et al. | |
| 2018/0270756 A1 | 9/2018 | Bhattad et al. | |
| 2018/0270799 A1* | 9/2018 | Noh | H04L 5/0051 |
| 2018/0324678 A1* | 11/2018 | Chen | H04W 56/001 |
| 2019/0081840 A1* | 3/2019 | Park | H04L 27/2613 |
| 2019/0097779 A1 | 3/2019 | Wu et al. | |
| 2019/0159128 A1 | 5/2019 | Lin et al. | |
| 2019/0174466 A1 | 6/2019 | Zhang et al. | |
| 2019/0239189 A1 | 8/2019 | Hwang et al. | |
| 2019/0281587 A1 | 9/2019 | Zhang et al. | |
| 2019/0320490 A1 | 10/2019 | Liu et al. | |
| 2019/0349856 A1 | 11/2019 | Liu et al. | |
| 2020/0029302 A1 | 1/2020 | Cox et al. | |
| 2020/0092814 A1 | 3/2020 | Zhou et al. | |
| 2020/0196242 A1 | 6/2020 | Höglund et al. | |
| 2020/0221416 A1 | 7/2020 | Wong et al. | |
| 2021/0037469 A1 | 2/2021 | Åström et al. | |
| 2021/0153120 A1 | 5/2021 | Atungsiri et al. | |
| 2021/0297199 A1 | 9/2021 | Miao | |
| 2021/0314866 A1 | 10/2021 | Lee et al. | |

FOREIGN PATENT DOCUMENTS

| | | |
|---|---|---|
| WO | 2018074766 A1 | 4/2018 |
| WO | 2018174805 A1 | 9/2018 |
| WO | 2019048248 A1 | 3/2019 |

OTHER PUBLICATIONS

U.S. Appl. No. 17/285,408, Non-Final Office Action, dated May 18, 2022, 23 pages.

CATT, CMCC, VIVO, CATR, Qualcomm, Mediatek, "New SID: Study on UE Power Saving and Wakeup Mechanism in NR", RP-180229, 3GPP TSG RAN Meeting #79, Chennai, India, Agenda Item 9.1.1, 5 pages.

Mediatek Inc., "Wake Up Signal Configuration for NB-IoT", R1-1801683, 3GPP TSG RAN WG1 Meeting #92, Athens, Greece, Agenda Item 6.2.6.1.1.2, 6 pages.

PCT/US2019/056146, International Search Report and Written Opinion, dated Jan. 31, 2020 00:00:00.0, 7 pages.

Sony, "Wake up signalling for efeMTC", R1-1712956, 3GPP TSG RAN WG1 Meeting #90, Prague, Czech Republic, Agenda Item 5.2.6.2, 13 pages.

Vivo, "NR UE power saving", R1-1806091, 3GPP TSG RAN WG1 Meeting #93, Busan, Korea, Agenda Item 7.9, 5 pages.

* cited by examiner

WAKE-UP SIGNAL DESIGN

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB), next generation node Bs (gNB), or new radio base stations (NR BS) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
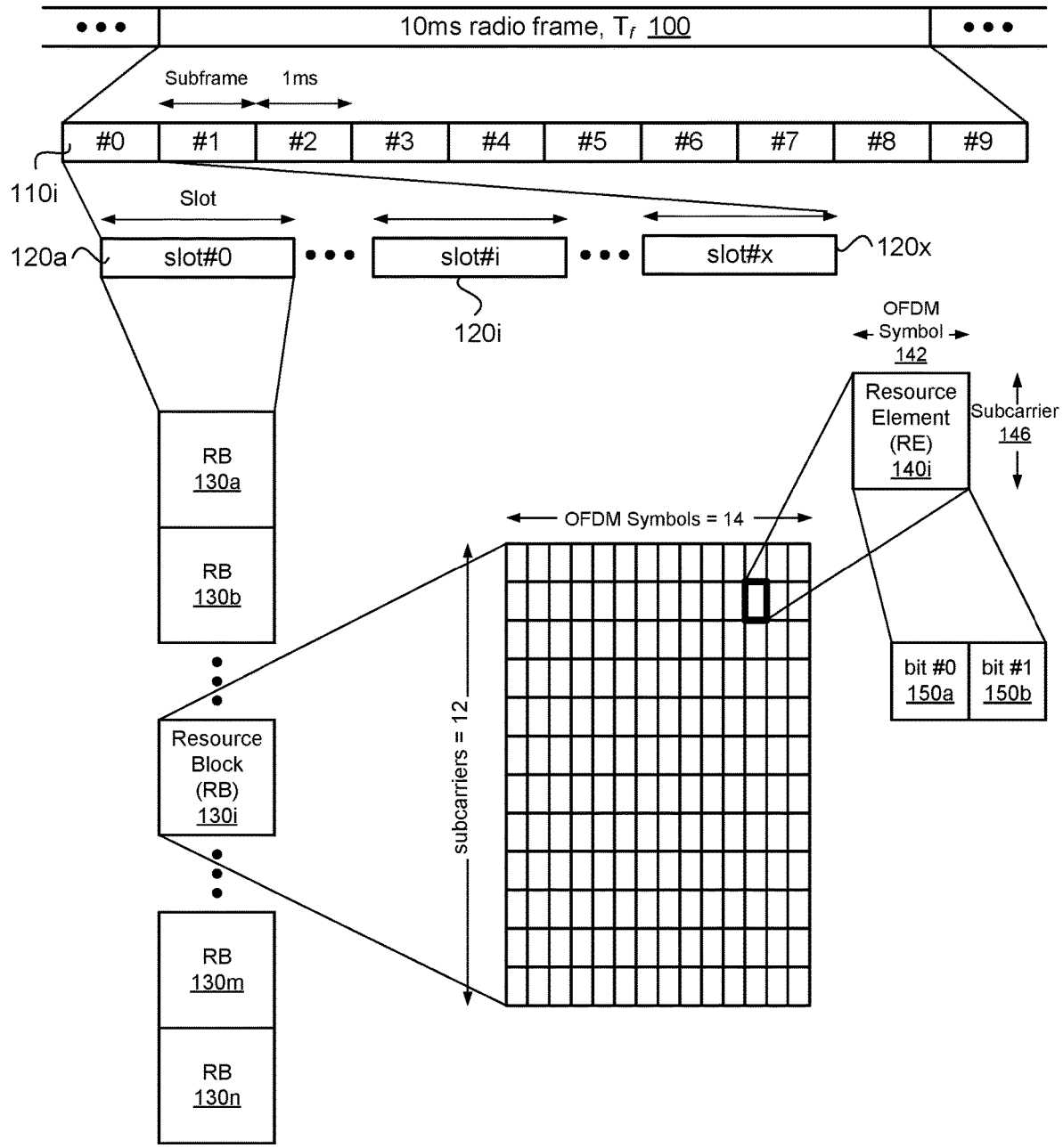
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

User equipment (UE) battery life is an aspect of the user's experience that can influence the adoption of fifth generation (5G) handsets and services. Therefore, UE power efficiency for 5G new radio (NR) UEs should be enhance relative to longer term evolution (LTE). Energy efficiency of a device can include: (a) efficient data transmission in a high data scenario; and (b) low energy consumption in a low data scenario. Efficient data transmission in a loaded case can be demonstrated by the average spectral efficiency. Low energy consumption in a low data case can be estimated by the sleep ratio.

In new radio (NR) user data can be transmitted in bursts and can be served in short durations. One UE power saving mechanism can include triggering a UE for network access from a power efficient mode. The UE can stay in the power efficient mode, such as micro sleep or an OFF period in a long discontinuous reception (DRX) cycle, unless the UE is informed of network access through a UE power saving framework. Alternatively, the network can assist the UE to switch from a "network access" mode (NAM) to a "power efficient" mode (PAM) when there is a small amount of traffic to deliver (e.g. dynamic UE transition to sleep based on a network assistance signal).

Because more than half of the power consumption in LTE can take place with the UE in the network access mode, power consumption should be reduced during the network access in RRC_CONNECTED mode. Some power consuming factors in network access mode can include: the processing of aggregated bandwidth, the number of active RF chains, the active reception time, the transmission time, and the dynamic transition to power efficient mode. Because LTE field transmission time intervals (TTIs) can include a small amount of data, power saving can be configured for dynamic adaptation of different data arrival. In one example, network assistant wake-up signaling can signal a UE to switch from a UE power saving mode (PSM) to a network access mode (NAM).

In one example, an apparatus of a user equipment (UE) operable for wake-up signal (WUS) communication in a fifth generation (5G) new radio (NR) network can comprise one or more processors. The one or more processors can be configured to: identify, at the UE, a resource set for a WUS with a repetition level, wherein: the resource set for the WUS includes a mapping of the WUS that associates the WUS with one or more physical resource blocks and one or more orthogonal frequency division multiplexing (OFDM) symbols, and the repetition level identifies a number of base sequences for the WUS in the resource set. The one or more processors can be configured to: monitor, at the UE, the resource set for the WUS with the repetition level. The one or more processors can be configured to: decode, at the UE, a transmission received from a new radio node B (gNB) in the resource set for the WUS. The one or more processors can be configured to: switch, at the UE, to a network access mode (NAM) from a power saving mode (PSM) based on a detection of the WUS in the resource set. The apparatus can further comprise a memory interface configured to store the resource set for the WUS in a memory.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μ ms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140$i$ can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the NR BS to the UE, or the RB can be configured for an uplink transmission from the UE to the NR BS.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

WUS-Assisted DRX Transmission

Figure 2:
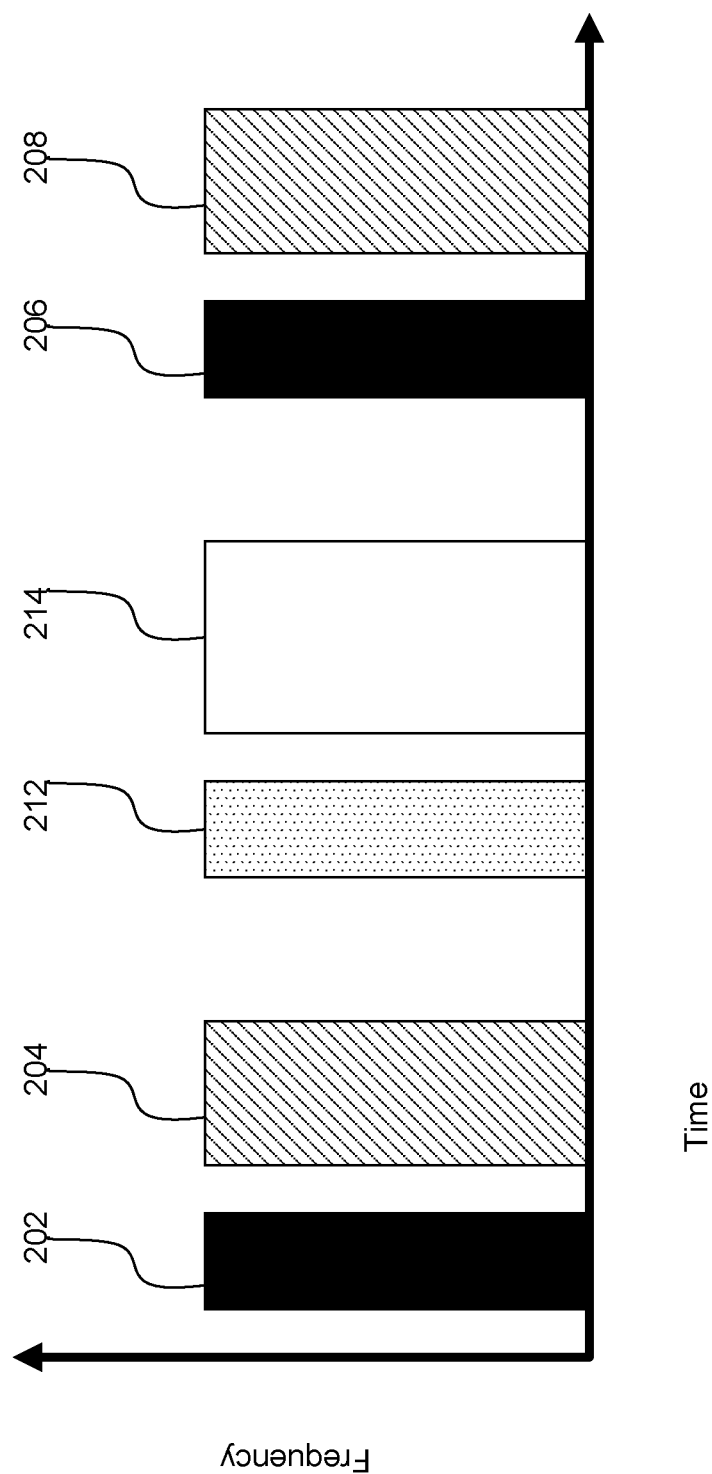
FIG. 2 illustrates wake-up signal (WUS) assisted discontinuous reception (DRX) in accordance with an example.

In another example, as illustrated in FIG. 2, a wake-up signal (WUS) 202 or 206 can be configured with discontinuous transmission (DTX) 212. Radio resource control (RRC)-Connected mode discontinuous reception (DRX)) (CDRX) can be configured for a WUS signal 202 or 206 associated with each drx-onDuration occasion 204 or 208 or a DTX signal 212 associated with each drx-onDuration occasion 214.

Figure 3:
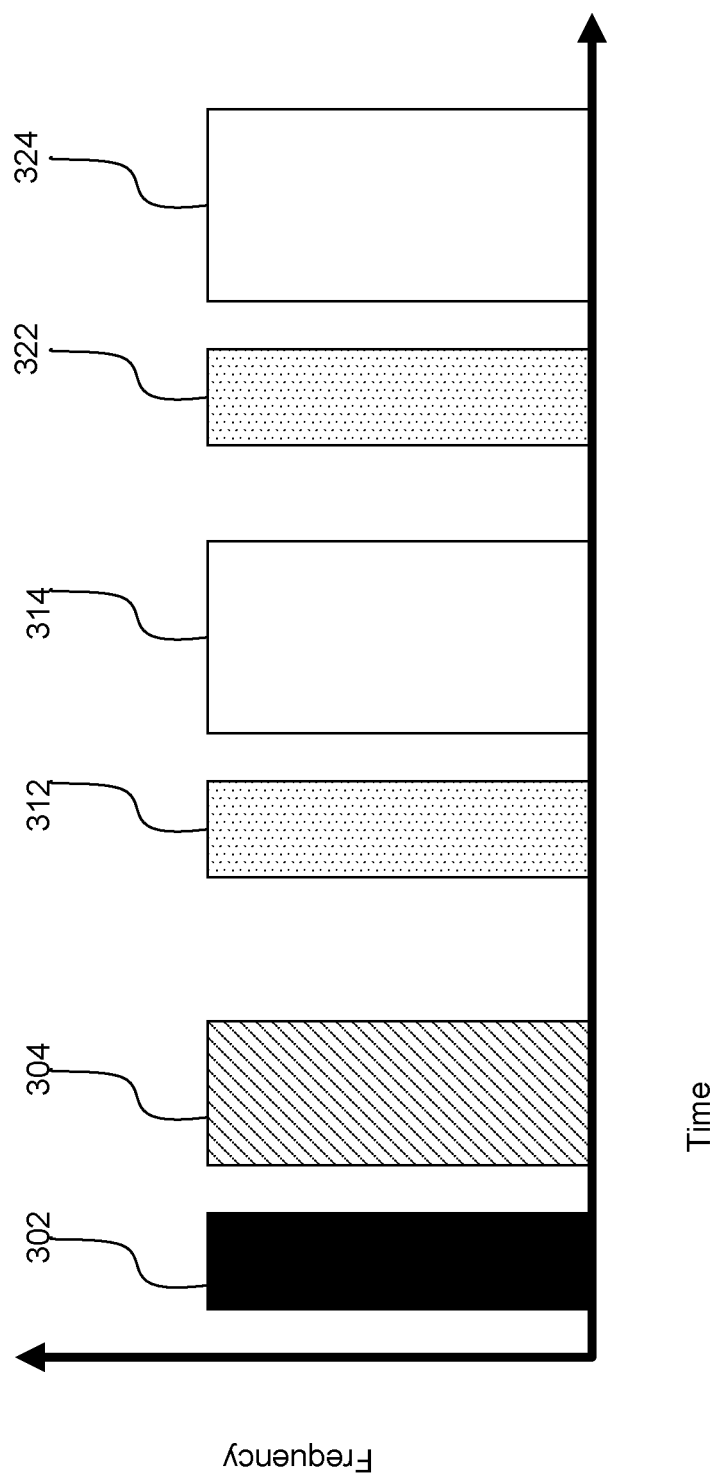
FIG. 3 illustrates wake-up signal (WUS) assisted discontinuous reception (DRX)in accordance with an example.

In another example, as illustrated in FIG. 3, a WUS signal 302 can be associated with an onDuration occasion 304 or a DTX signal 312 or 322 can be associated with N consecutive onDuration occasions 314 or 324, wherein N can be an integer greater than or equal to 1. In this example N=2. In this example, detecting a WUS can indicate to the UE to remain in or switch to a network access mode for the next two DRX cycles. When the WUS is detected by the UE, the UE can enter "network access mode" (NAM) (i.e. medium access control (MAC) entity switching to "Active Time" during the associated drx-onDuration period) in which physical downlink control channel (PDCCH) monitoring can be performed. Alternatively, when no WUS (DTX) is detected, the UE can remain in a power saving mode (i.e., the MAC entity in "non-active time" during the associated drx-onDuration occasion) in which PDCCH monitoring is not performed.

Wake-Up Signal Transmission

Base WUS Sequence

In another example, a base WUS can be a sequence mapped to consecutive resource blocks (RBs) in one or more consecutive or non-contiguous OFDM symbols, wherein the number of consecutive RBs can be X, wherein X can be an integer greater than or equal to 1. In one example, X can be 6. The starting position in frequency (i.e., RB index) can be indicated by higher layer signaling as part of a configuration (e.g., WUS configuration). In one example, the sequence can be mapped over an entire active bandwidth part (BWP). In another example, the sequence can be mapped to each odd or even RB in the active BWP. The frequency domain occupancy can be indicated by higher layer signaling as part of a configuration, such as WUS configuration. In another example, the sequence can be mapped to the frequency domain according to a higher layer parameter, density, in which density can be referenced by ρ (e.g., resource mapping can occur in every ρ RB within the BWP). In one example, frequency domain location can be indicated by a bitmap.

In another example, time-domain locations can be provided by a higher layer parameter. In one example, before the beginning of OnDuration in a DRX cycle, a resource set spanning a set of RBs and a set of symbols can be configured to contain a WUS transmission. In one example, the WUS transmission can be transmitted with a single antenna port. In another example, the WUS transmission can be transmitted in the ith and jth symbols in a slot, wherein I can be an integer ranging from 1 to 13 and j can be an integer ranging from 1 to 13. In one example, i may not be equal to j. In one example, the WUS transmission pattern can be repeated in every Nth slot, wherein N is an integer greater than or equal to 1. In one example, the UE can monitor the WUS in every 2 slots (e.g., N=2), wherein, in each slot, the WUS can be transmitted in the 4$^{th}$ symbol and the 11$^{th}$ symbol.

In another example, the sequence can be generated in accordance with a long-term evolution (LTE) narrow band internet of things (NB-IoT) WUS (i.e., a Zadoff-Chu (ZC) sequence with a Gold sequence based cover code). In one example, the cover code sequence can be initialized by a UE-specific parameter, (e.g., a configured UE cell radio network temporary identifier (C-RNTI) and a time component (e.g., the slot interval between the first slot containing the WUS transmission and the associated drx-onDuration occasion).

In another example, the WUS sequence can be generated using: $d_{wus}(n) = c(m) \cdot g(n)$, wherein g(n) can represent a cell-specific sequence and c(m) can denote a UE-specific sequence.

In another example, the sequence g (n) can be generated by using a ZC-sequence, e.g., $g(n) = e^{-j\pi u n'(n'+1)/L_{ZC}}$, wherein n'=n mod $L_{ZC}$, $L_{ZC}$ can define the length of ZC sequence, and u can be predetermined or configured in a cell-specific manner.

In another example, the sequence g(n) can be generated using a secondary synchronization signal (SSS) sequence:
$g(n) = [1 - 2x_0((n'+m_0) \bmod 127)][1 - 2x_1((n'+m_1) \bmod 127)]$, wherein $$m_0 = 15 \left\lfloor \frac{N_{ID}^{(1)}}{112} \right\rfloor + 5 N_{ID}^{(2)}, m_1 = N_{ID}^{(1)}$$

mod 112, 0≤n<127, wherein n'=n mod 127, $x_0(i+7)=(x_0(i+4)+x_0(i)) \bmod 2$, $x_1(i+7)=(x_1(i+1)+(0)) \bmod 2$, $[x_0(6) \, x_0(5) \, x_0(4) \, x_0(3) \, x_0(2) \, x_0(1) \, x_0(0)] = [0\,0\,0\,0\,0\,0\,1]$, $[x_1(6) \, x_1(5) \, x_1(4) \, x_1(3) \, x_1(2) \, x_1(1) \, x_1(0)] = [0\,0\,0\,0\,0\,0\,1]$, and $N_{ID}^{(1)}$ is cell group identifier (ID), and $N_{ID}^{(2)}$ is a cell in-group identifier ID.

In another example, the WUS can be generated without using a cell-specific component sequence g(n) so that: $d_{wus}(n) = c(n)$, wherein c(n) can be generated by a length-31 Gold sequence such that: $c(n) = [1 - 2x_0(n+m_0)][1 - 2x_1(n+m_0)]$, wherein $m_0 = 1600$, $x_0(i+31) = (x_0(i+3) + x_0(0)) \bmod 2$, $x_1(i+31) = (x_1(i+3) + x_1(i+2) + x_1(i+1) + x_1(i)) \bmod 2$, $x_0(0) = 1$, $x_0(n) = 0, n = 1 \ldots, 30$, $c_{init\_wus} = \Sigma_{i=0}^{30} x_1(i)$ shall be initialized by UE-specific manner, and configured by RRC signaling.

In another example, the sequence can be generated as c(n):

$$c(n) = \frac{1}{\sqrt{2}}(1 - 2r(2m)) + j\frac{1}{\sqrt{2}}(1 - 2r(2m+1)),$$

wherein the pseudo-random (PN) sequence r(m) can be defined by length-31 Gold sequence, and the sequence r(m) of length $M_r$, wherein m=0, 1, . . . , $M_r$−1, wherein $r(m) = (y_1(m+N_c) + y_2(m+N_c)) \bmod 2$, $y_1(m+31) = (y_1(m+3) + y_1(m)) \bmod 2$, $y_2(m+31) = (y_2(m+3) + y_2(m+2) + y_2(m) + y_2(m)) \bmod 2$, wherein $N_c = 1600$. In another example, the first m-sequence $y_1(m)$ can be initialized with $y_1(0) = 1$, $y_1(m) = 0$, m=1, 2, . . . , 30, and $y_2$ (m) can be the other m-sequence.

In another example, the PN sequence r(m) can be initialized with $r_{init} = (2^{10})(N_{symb}^{slot} n_{s,f}^\mu + l + 1)(2n_{ID} + 1) + n_{ID}) \bmod 2^{31}$, wherein at the start of each OFDM symbol where $n_{s,f}^\mu$ can be the slot number within a radio frame, l can be the OFDM symbol number within a slot, and $n_{ID}$ can be a higher-layer indicated parameter, such as a scramblingID or a WUSsequenceGenerationConfig. In another example, $n_{ID}$ can be a cell radio network temporary identifier (C-RNTI) or a UE specific configurable ID.

UE-Specific Initialization of c(n)

In another example, $c_{init\_wus} = f(n_{RNTI}) \bmod 2^{31}$ where f ($n_{RNTI}$) can be a function of $n_{RNTI}$, which can be C-RNTI configured to the UE. In another example, the function can be $f(n_{RNTI}) = n_{RNTI}$.

In another example, $c_{init\_WUS} = f(n_{RNTI}, N_{ID}) \bmod 2^{31}$, wherein $f(n_{RNTI}, N_{ID})$ can be a function of $n_{RNTI}$ and $N_{ID}$, which can correspond to a UE C-RNTI and a physical cell ID.

In another example, $N_{ID}$ can refer to other virtual cell ID or bandwidth part ID. In one example, the function can be $f(n_{RNTI}, N_{ID}) = (n_{RNTI} 2^{16} + N_{ID}) \bmod 2^{31}$.

In another example, $c_{init\_WUS} = f(n_{RNTI}, N_{ID}, n_{sl\_O}) \bmod 2^{31}$, wherein $f(n_{RNTI}, N_{ID}, n_{sl\_O})$ can be a function of $n_{RNTI}$, $N_{ID}$, and $n_{sl\_O}$, which can correspond to the number of slot intervals between the (first) slot of a configured WUS/DTX and start slot of the associated drx-onDuration occasion. In another example, the $c_{init\_WUS}$ can range from 1 to $n_{sl\_O}^{MAX}$, wherein $n_{sl\_O}^{MAX}$ can be predetermined. In another example, when $n_{sl\_O}^{MAX} = 4$, $c_{init\_WUS} = (n_{RNTI} 2^{18} + (n_{sl\_O} - 1) 2^{16} + N_{ID}) \bmod 2^{31}$ Configurable Base WUS Sequence In another example, the base WUS sequence can be configured by radio resource control (RRC) signaling. The set of base WUS sequence lengths (e.g., {4, 6, 8}) can be predetermined. In another example, the RRC signaling parameter for WUS configuration can indicate the base WUS sequence length. In another example, for a UE with high channel quality conditions, a short base WUS sequence can be configured. In another example, for a UE with low channel quality conditions, a larger base WUS sequence length can be configured.

Link Adaptation of WUS Transmission

In another example, for a configured base WUS sequence length, different WUS transmission candidates of different repetition levels can be configured for different coverage targets. In one example, the WUS configuration can include Y WUS candidates, wherein Y can be an integer greater than or equal to 1 (e.g., Y can be 4 or 5), wherein each WUS candidate can correspond to a repetition level (e.g., RL1, RL2, RL4 and RL8). A WUS with a low repetition level can be used for UEs in high quality channel conditions while a WUS with a high repetition level can be configured for UEs in low quality channel conditions. In each WUS occasion, a network can select a specific WUS candidate to wake up the UE for the associated upcoming drx-onDuration occasion.

Figure 4:
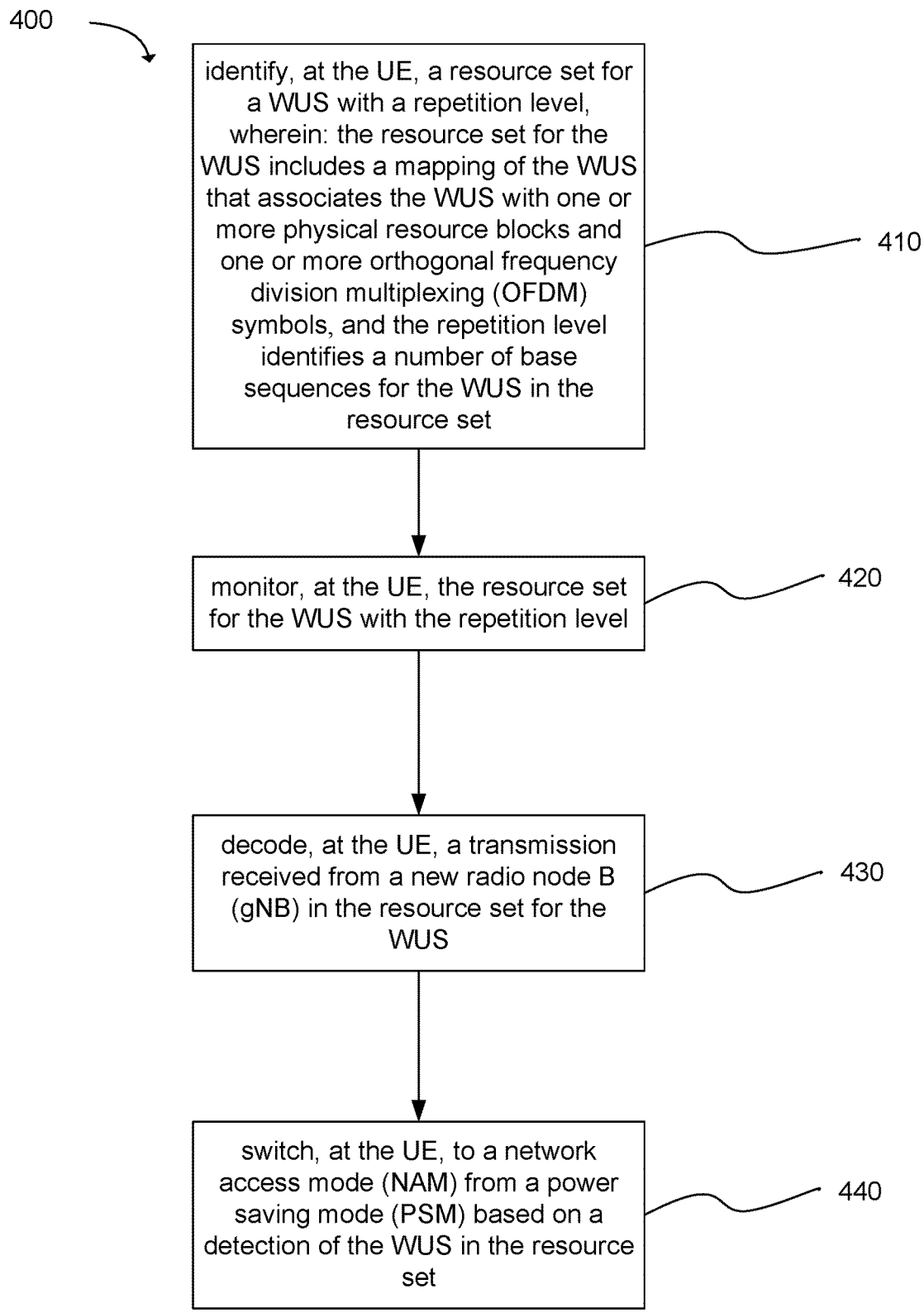
FIG. 4 depicts functionality of a user equipment (UE) operable for wake-up signal (WUS) communication in a fifth generation (5G) new radio (NR) network in accordance with an example.

Another example provides functionality 400 of a user equipment (UE) operable for wake-up signal (WUS) communication in a fifth generation (5G) new radio (NR) network, as shown in FIG. 4. The UE can comprise one or more processors. The one or more processors can be configured to identify, at the UE, a resource set for a WUS with a repetition level, wherein: the resource set for the WUS includes a mapping of the WUS that associates the WUS with one or more physical resource blocks and one or more orthogonal frequency division multiplexing (OFDM) symbols, and the repetition level identifies a number of base sequences for the WUS in the resource set, as in block 410. The one or more processors can be configured to monitor, at the UE, the resource set for the WUS with the repetition level, as in block 420. The one or more processors can be configured to decode, at the UE, a transmission received from a new radio node B (gNB) in the resource set for the WUS, as in block 430. The one or more processors can be configured to switch, at the UE, to a network access mode (NAM) from a power saving mode (PSM) based on a detection of the WUS in the resource set, as in block 440. In addition, the UE can comprise a memory interface configured to store the resource set for the WUS in a memory.

Figure 5:
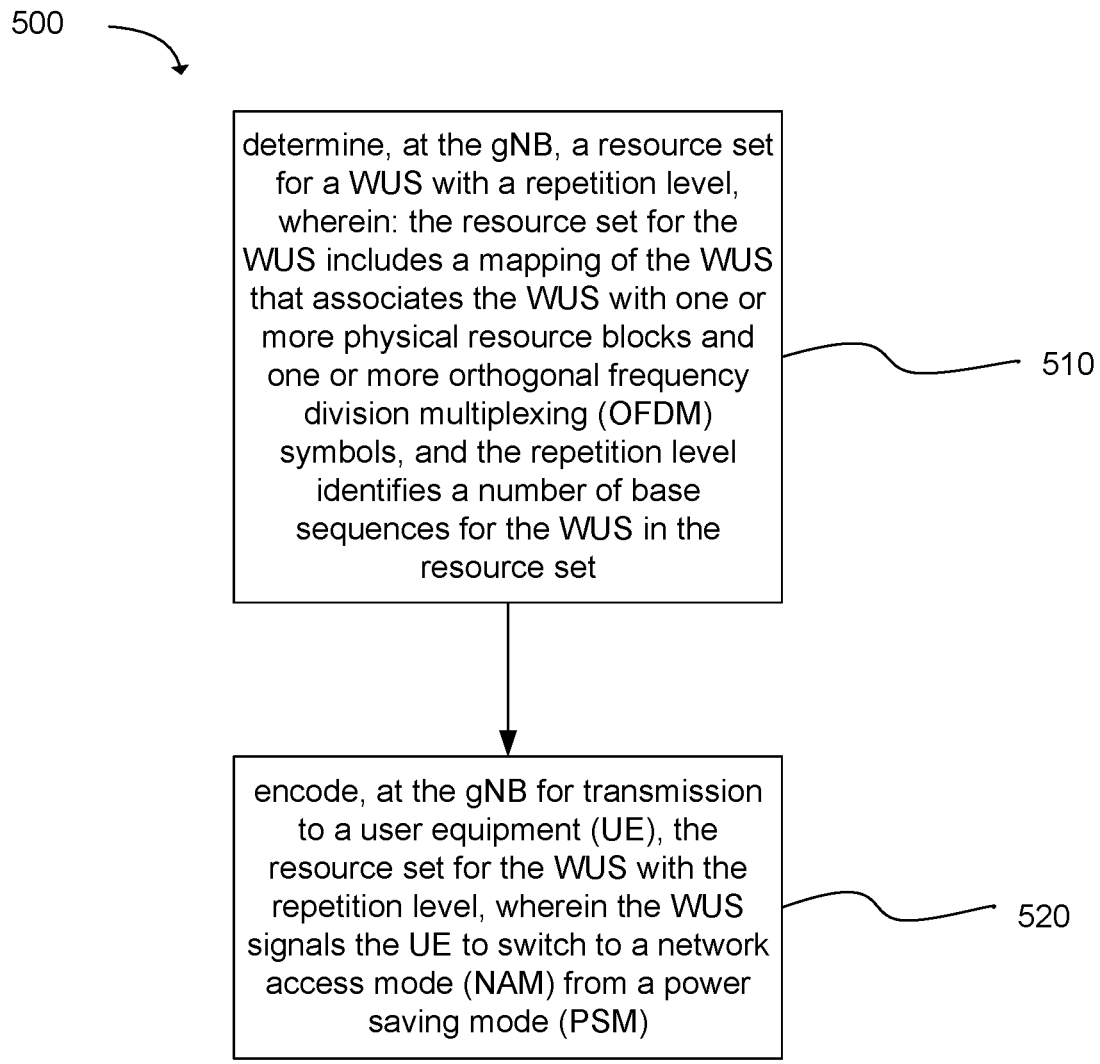
FIG. 5 depicts functionality of a new radio node B (gNB) operable for wake-up signal (WUS) communication in a fifth generation (5G) new radio (NR) network in accordance with an example.

Another example provides functionality 500 of a new radio node B (gNB) operable for wake-up signal (WUS) communication in a fifth generation (5G) new radio (NR) network, as shown in FIG. 5. The gNB can comprise one or more processors. The one or more processors can be configured to determine, at the gNB, a resource set for a WUS with a repetition level, wherein: the resource set for the WUS includes a mapping of the WUS that associates the WUS with one or more physical resource blocks and one or more orthogonal frequency division multiplexing (OFDM) symbols, and the repetition level identifies a number of base sequences for the WUS in the resource set, as in block 510. The one or more processors can be configured to encode, at the gNB for transmission to a user equipment (UE), the resource set for the WUS with the repetition level, wherein the WUS signals the UE to switch to a network access mode (NAM) from a power saving mode (PSM), as in block 520. In addition, the gNB can comprise a memory interface configured to store the resource set for the WUS in a memory.

Figure 6:
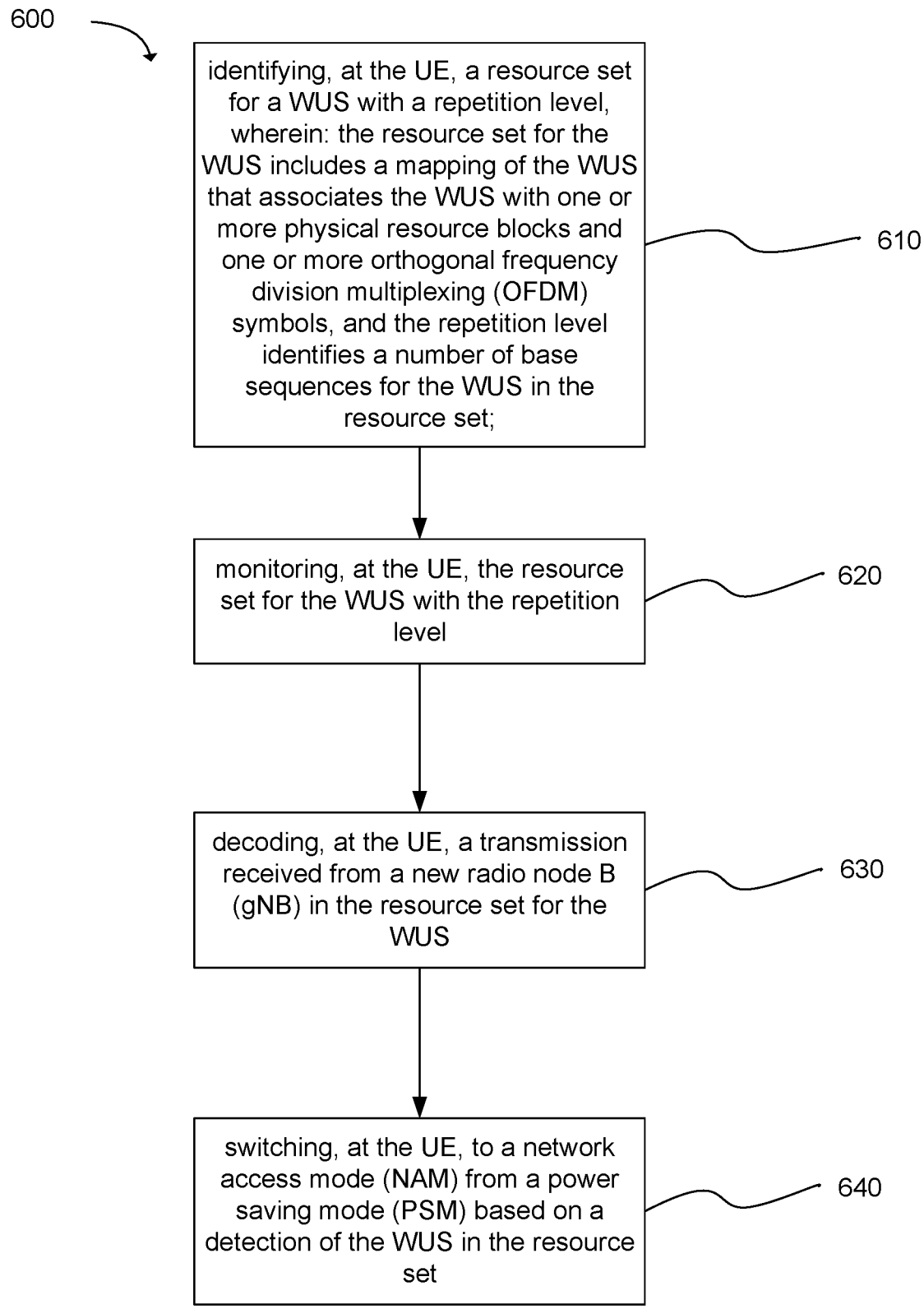
FIG. 6 depicts a flowchart of a machine readable storage medium having instructions embodied thereon for a user equipment (UE) operable for wake-up signal (WUS) communication in a fifth generation (5G) new radio (NR) network in accordance with an example.

Another example provides at least one machine readable storage medium having instructions 600 embodied thereon for wake-up signal (WUS) communication in a fifth generation (5G) new radio (NR) network, as shown in FIG. 6. The instructions can be executed on a machine, where the instructions are included on at least one computer readable medium or one non-transitory machine readable storage medium. The instructions when executed perform: identifying, at the UE, a resource set for a WUS with a repetition level, wherein: the resource set for the WUS includes a mapping of the WUS that associates the WUS with one or more physical resource blocks and one or more orthogonal frequency division multiplexing (OFDM) symbols, and the repetition level identifies a number of base sequences for the WUS in the resource set, as in block 610. The instructions when executed perform: monitoring, at the UE, the resource set for the WUS with the repetition level, as in block 620. The instructions when executed perform: decoding, at the UE, a transmission received from a new radio node B (gNB) in the resource set for the WUS, as in block 630. The instructions when executed perform: switching, at the UE, to a network access mode (NAM) from a power saving mode (PSM) based on a detection of the WUS in the resource set, as in block 640.

While examples have been provided in which a gNB has been specified, they are not intended to be limiting. An evolved node B (eNB), a next generation node B (gNB), a new radio node B (gNB), or a new radio base station (NR BS) can be used in place of a gNB. Accordingly, unless otherwise stated, any example herein in which a gNB has been disclosed, can similarly be disclosed with the use of an eNB, gNB, or new radio base station (NR BS).

Figure 7:
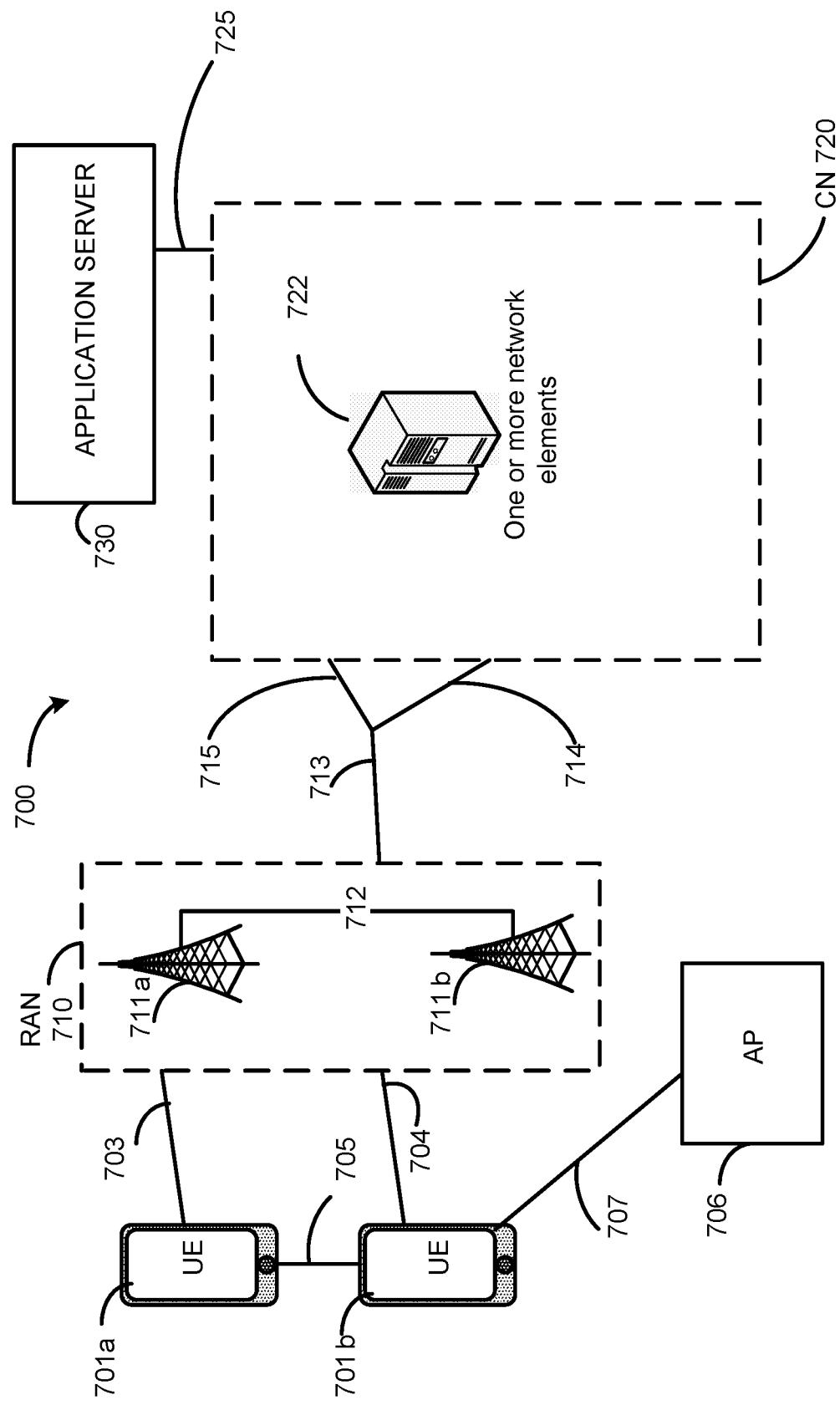
FIG. 7 illustrates an example architecture of a system of a network in accordance with an example.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701*a* and UE 701*b* (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with RAN 710. In embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701*b* is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs, and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701b within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 711 may be configured to communicate with one another via interface 712. In embodiments where the system 700 is an LTE system, the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system, the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMEs.

Figure 8:
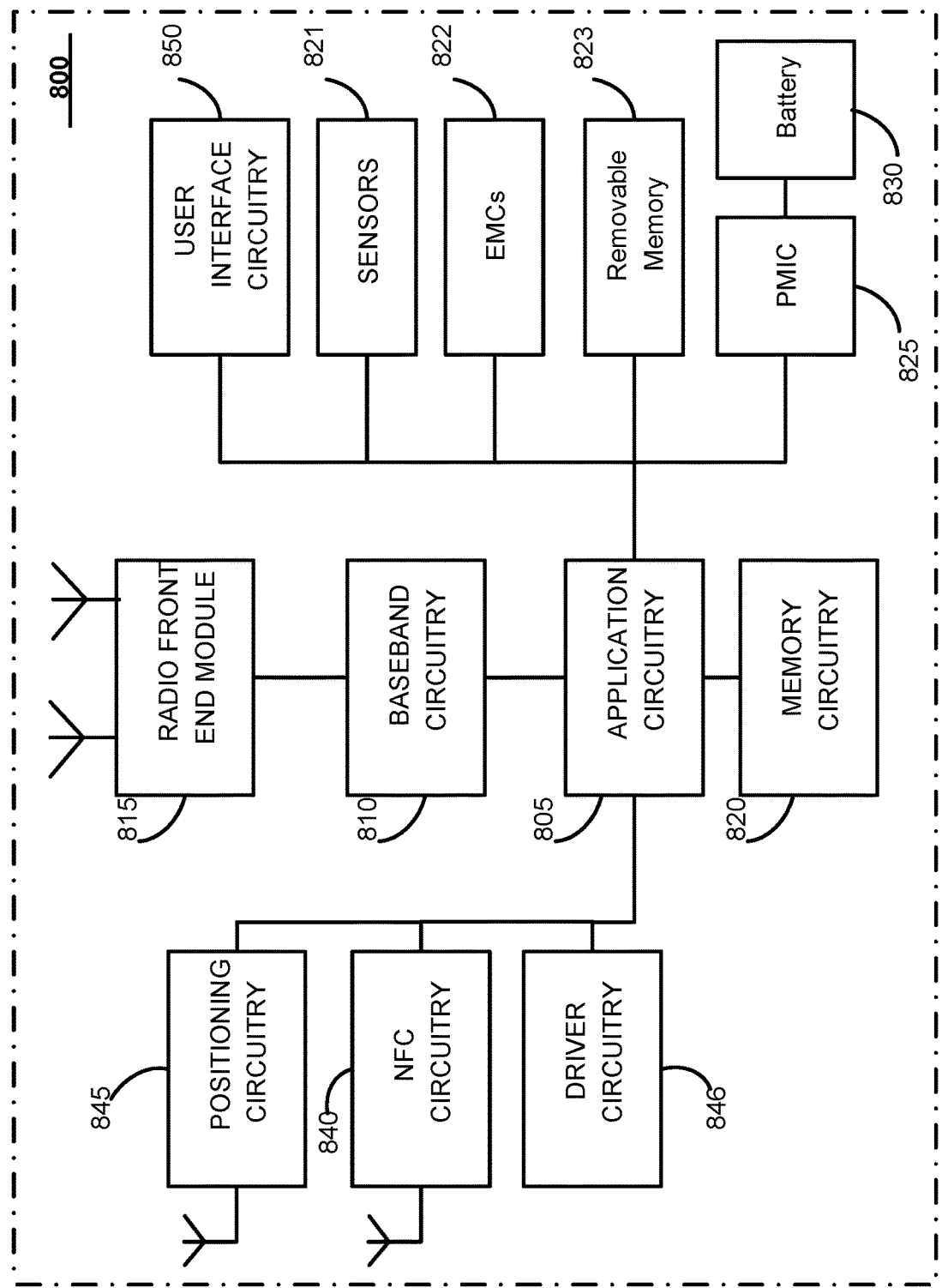
FIG. 8 illustrates an example of a platform or device in accordance with an example.

FIG. 8 illustrates an example of a platform 800 (or "device 800") in accordance with various embodiments. In embodiments, the computer platform 800 may be suitable for use as UEs 701, application servers 730, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 9.

The RFEMs 815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signalling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 701.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it can transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 9:
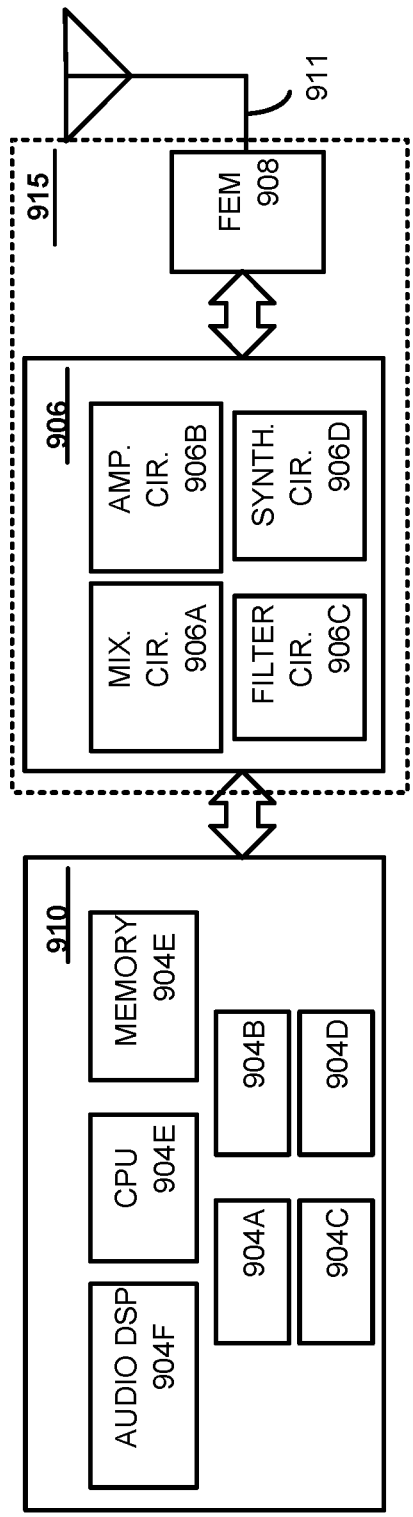
FIG. 9 illustrates example components of baseband circuitry and radio front end modules (RFEM) in accordance with an example.

FIG. 9 illustrates example components of baseband circuitry 910 and radio front end modules (RFEM) 915 in accordance with various embodiments. The baseband circuitry 910 corresponds to the baseband circuitry 810 of FIG. 8, respectively. The RFEM 915 corresponds to the RFEM 815 of FIG. 8, respectively. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 805 (see FIG. 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 805 of FIG. 9); an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 910 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a of the transmit signal path may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 805 depending on the desired output frequency. In some embodiments, a divider control input (e.g., N) may be determined from a look-up table based on a channel indicated by the application circuitry 805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
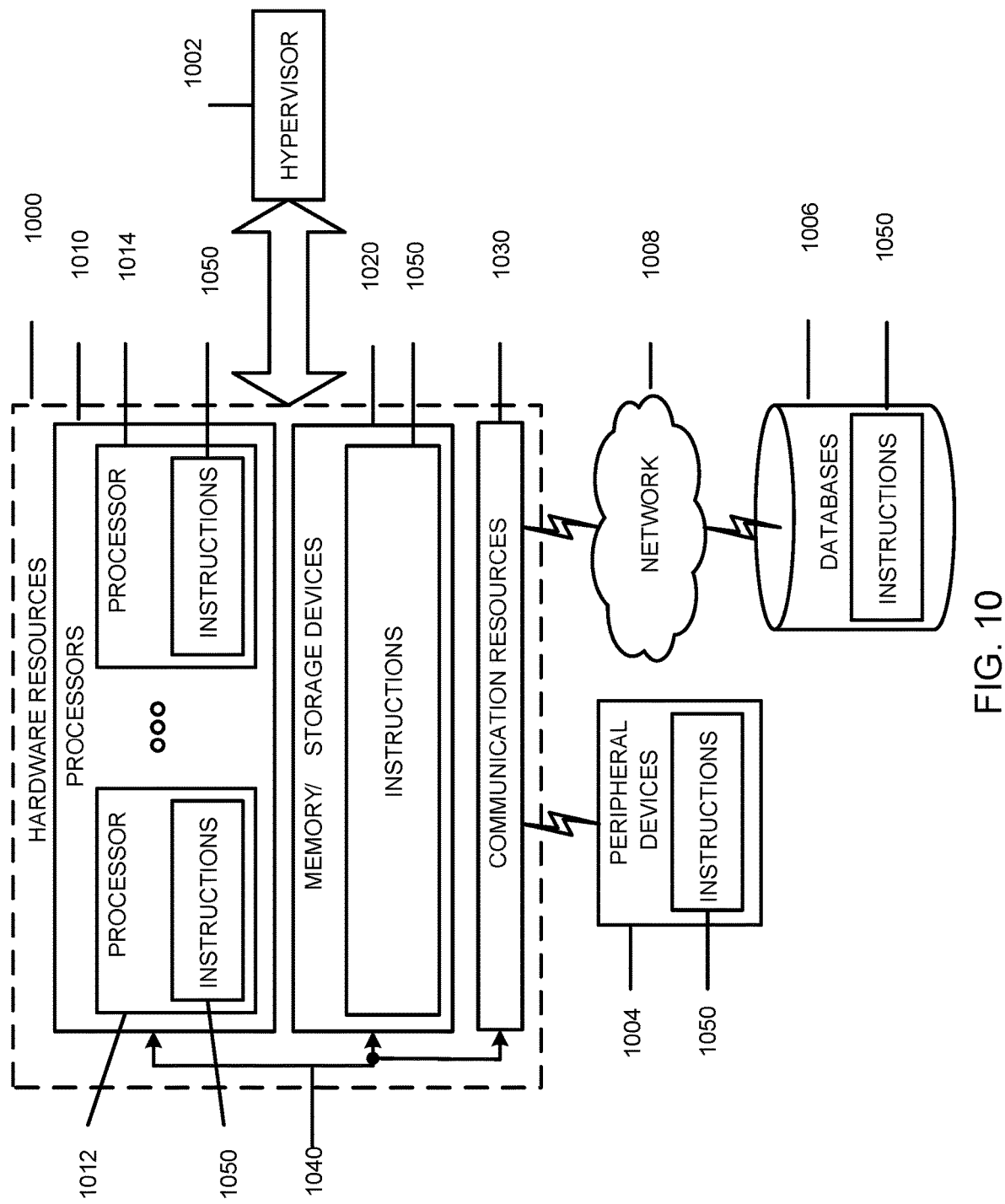
FIG. 10 is a block diagram illustrating components able to read instructions from a machine-readable or computer-readable medium in accordance with an example.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Figure 11:
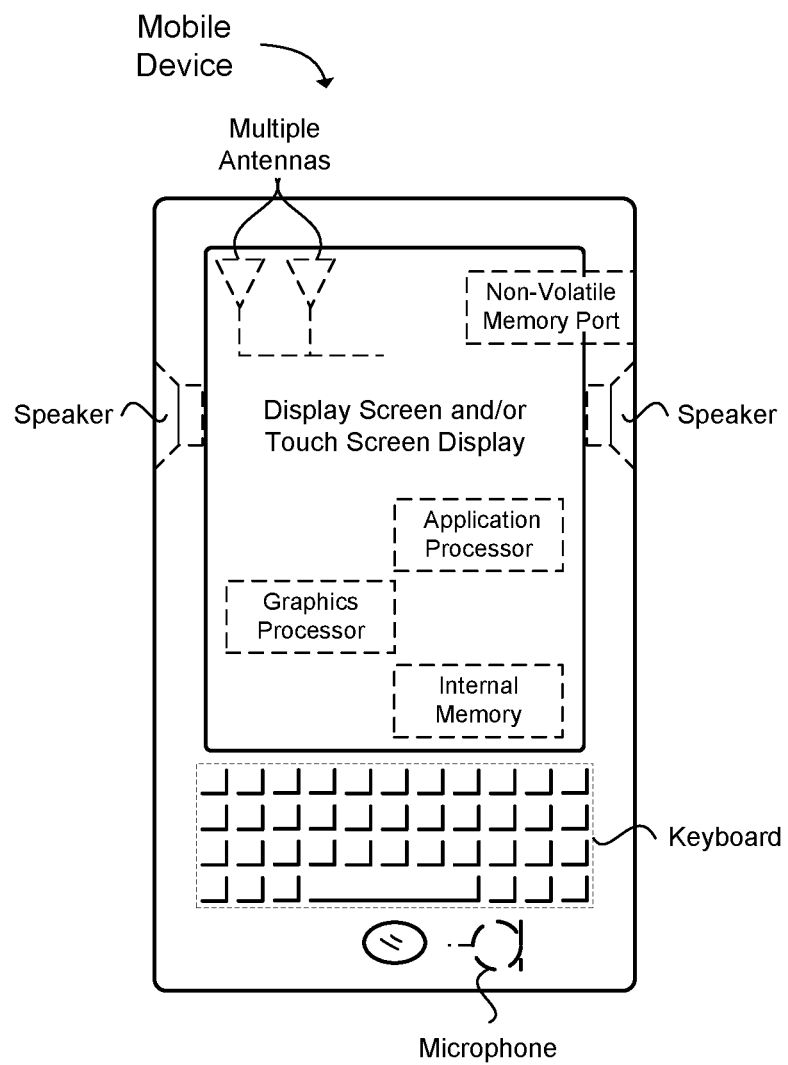
FIG. 11 illustrates a diagram of a wireless device (e.g., UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

The following examples pertain to specific technology embodiments and point out specific features, elements, or actions that can be used or otherwise combined in achieving such embodiments.

Example 1 includes an apparatus of a user equipment (UE) operable for wake-up signal (WUS) communication in a fifth generation (5G) new radio (NR) network, the apparatus comprising: one or more processors configured to: identify, at the UE, a resource set for a WUS with a repetition level, wherein: the resource set for the WUS includes a mapping of the WUS that associates the WUS with one or more physical resource blocks and one or more orthogonal frequency division multiplexing (OFDM) symbols, and the repetition level identifies a number of base sequences for the WUS in the resource set; monitor, at the UE, the resource set for the WUS with the repetition level; decode, at the UE, a transmission received from a new radio node B (gNB) in the resource set for the WUS; and switch, at the UE, to a network access mode (NAM) from a power saving mode (PSM) based on a detection of the WUS in the resource set; and a memory interface configured to store the resource set for the WUS in a memory.

Example 2 includes the apparatus of Example 1, wherein the one or more processors are further configured to: detect, at the UE, the repetition level of the resource set for the WUS.

Example 3 includes the apparatus of Example 1, wherein the one or more processors are further configured to: identify, at the UE, the resource set for the WUS, wherein the WUS includes a cell-specific sequence and a UE-specific sequence.

Example 4 includes the apparatus of Example 3, wherein the one or more processors are further configured to: identify, at the UE, the resource set for the WUS, wherein the cell-specific sequence is generated from a Zadoff-Chu (ZC) sequence with a Gold cover code sequence initialized by a UE-specific parameter using: g(n)=e^(-jŒÄŒ° n'(n'+1)/L_ZC), wherein: g(n) is the cell-specific sequence, Œ° is predetermined or configured via cell-specific signaling, and n' is n mod Lzc, and Lzc is a length of the ZC sequence; or identify, at the UE, the resource set for the WUS, wherein the cell-specific sequence is generated from a secondary synchronization signal (SSS).

Example 5 includes the apparatus of Example 1, wherein the one or more processors are further configured to: identify, at the UE, the resource set for the WUS, wherein the WUS includes a UE-specific sequence that is generated from a length-31 Gold sequence.

Example 6 includes the apparatus of Example 1, wherein the one or more processors are further configured to: identify, at the UE, the resource set for the WUS, wherein the WUS includes a UE-specific initialization of a UE-specific sequence, wherein the UE-specific initialization is based on one or more of: a cell radio network temporary identifier (C-RNTI), a physical cell identifier (ID), a virtual cell ID, a bandwidth part ID (BWP ID), or a slot interval.

Example 7 includes the apparatus of Example 1, wherein the one or more processors are further configured to: identify, at the UE, a length of a base sequence of the number of base sequences, wherein the length of the base sequence is based on a coverage target level of the UE and is configured via radio resource control (RRC) signaling.

Example 8 includes the apparatus of Example 1, wherein the one or more processors are further configured to: identify, at the UE, the resource set for the WUS from one or more of: a starting position in frequency of the resource set, a bandwidth part (BWP) of the resource set, a density of the resource set, a bitmap of a frequency-domain location of the resource set, a higher-layer parameter of a time-domain location, one or more antenna ports for transmission of the WUS, one or more slot indices of the resource set, or one or more symbol indices of the resource set.

Example 9 includes the apparatus of any of Examples 1 to 8, wherein the resource set for the WUS is configured via radio resource control (RRC) signaling.

Example 10 includes an apparatus of a new radio node B (gNB) operable for wake-up signal (WUS) communication in a fifth generation (5G) new radio (NR) network, the apparatus comprising: one or more processors configured to: determine, at the gNB, a resource set for a WUS with a repetition level, wherein: the resource set for the WUS includes a mapping of the WUS that associates the WUS with one or more physical resource blocks and one or more orthogonal frequency division multiplexing (OFDM) symbols, and the repetition level identifies a number of base sequences for the WUS in the resource set; encode, at the gNB for transmission to a user equipment (UE), the resource set for the WUS with the repetition level, wherein the WUS signals the UE to switch to a network access mode (NAM) from a power saving mode (PSM); and a memory interface configured to store the resource set for the WUS in a memory.

Example 11 includes the apparatus of Example 10, wherein the one or more processors are further configured to: select, at the gNB, the repetition level of the resource set for the WUS based on a channel condition of the UE.

Example 12 includes the apparatus of Example 10, wherein the one or more processors are further configured to: determine, at the gNB, the resource set for the WUS, wherein the WUS includes a cell-specific sequence and a UE-specific sequence.

Example 13 includes the apparatus of Example 12, wherein the one or more processors are further configured to: determine, at the gNB, the resource set for the WUS, wherein the cell-specific sequence is generated from a Zadoff-Chu (ZC) sequence with a Gold cover code sequence initialized by a UE-specific parameter using: g(n)=e^(-jŒÄ Œ° n'(n'+1)/L_ZC), wherein: g(n) is the cell-specific sequence, Œ° is predetermined or configured via cell-specific signaling, and n' is n mod Lzc, and Lzc is a length of the ZC sequence; or determine, at the gNB, the resource set for the WUS, wherein the cell-specific sequence is generated from a secondary synchronization signal (SSS).

Example 14 includes the apparatus of Example 10, wherein the one or more processors are further configured to: determine, at the gNB, the resource set for the WUS, wherein the WUS includes a UE-specific sequence that is generated from a length-31 Gold sequence.

Example 15 includes the apparatus of Example 10, wherein the one or more processors are further configured to: determine, at the gNB, the resource set for the WUS, wherein the WUS includes a UE-specific initialization of a UE-specific sequence, wherein the UE-specific initialization is based on one or more of: a cell radio network temporary identifier (C-RNTI), a physical cell identifier (ID), a virtual cell ID, a bandwidth part ID (BWP ID), or a slot interval.

Example 16 includes the apparatus of Example 10, wherein the one or more processors are further configured to: determine, at the gNB, a length of a base sequence of the number of base sequences, wherein the length of the base sequence is based on a coverage level of the UE and is configured via radio resource control (RRC) signaling.

Example 17 includes the apparatus of any of Examples 10 to 16, wherein the resource set for the WUS is configured via radio resource control (RRC) signaling, wherein the resource set for the WUS is identifiable from one or more of: a starting position in frequency of the resource set, a bandwidth part (BWP) of the resource set, a density of the resource set, a bitmap of a frequency-domain location of the resource set, a higher-layer parameter of a time-domain location, one or more antenna ports for transmission of the WUS, one or more slot indices of the resource set, or one or more symbol indices of the resource set.

Example 18 includes at least one machine readable storage medium having instructions embodied thereon for wake-up signal (WUS) communication in a fifth generation (5G) new radio (NR) network, the instructions when executed by one or more processors at a user equipment (UE) perform the following: identifying, at the UE, a resource set for a WUS with a repetition level, wherein: the resource set for the WUS includes a mapping of the WUS that associates the WUS with one or more physical resource blocks and one or more orthogonal frequency division multiplexing (OFDM) symbols, and the repetition level identifies a number of base sequences for the WUS in the resource set; monitoring, at the UE, the resource set for the WUS with the repetition level; decoding, at the UE, a transmission received from a new radio node B (gNB) in the resource set for the WUS; and switching, at the UE, to a network access mode (NAM) from a power saving mode (PSM) based on a detection of the WUS in the resource set.

Example 19 includes the at least one machine readable storage medium of Example 18, further comprising instructions that when executed perform: selecting, at the UE, the repetition level of the resource set for the WUS based on a channel condition of the UE.

Example 20 includes the at least one machine readable storage medium of Example 18, further comprising instructions that when executed perform: identifying, at the UE, the resource set for the WUS from one or more of: a starting position in frequency of the resource set, a bandwidth part (BWP) of the resource set, a density of the resource set, a bitmap of a frequency-domain location of the resource set, a higher-layer parameter of a time-domain location, one or more antenna ports for transmission of the WUS, one or more slot indices of the resource set, or one or more symbol indices of the resource set.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A user equipment (UE) operable for wake-up signal (WUS) communication in a-wireless network, the UE comprising:
   one or more processors configured to:
      identify, at the UE, a resource set for a WUS, wherein the WUS includes a cell-specific sequence generated from a Zadoff-Chu (ZC) sequence with a Gold cover code sequence initialized by a UE-specific parameter using $g(n)=e^{-j\pi\mu n'(n'+1)/L_{ZC}}$, where $g(n)$ is the cell-specific sequence, $\mu$ is predetermined or configured via cell-specific signaling, n' is n mod $L_{zc}$, and $L_{zc}$ a length of the ZC sequence;
      monitor, at the UE, the resource set for the WUS;
      decode, at the UE, a transmission received from a base station in the resource set for the WUS; and
      switch, at the UE, to a network access mode (NAM) from a power saving mode (PSM) based on a detection of the WUS in the resource set; and
   a memory interface configured to store the resource set for the WUS in a memory.

2. The UE of claim 1, wherein the one or more processors are further configured to detect, at the UE, a repetition level of the resource set for the WUS.

3. The UE of claim 1, wherein the WUS further includes a UE-specific sequence generated from a length-31 Gold sequence.

4. The UE of claim 1, wherein the WUS includes a UE-specific initialization of a UE-specific sequence, wherein the UE-specific initialization is based on one or more of: a cell radio network temporary identifier (C-RNTI), a physical cell identifier (ID), a virtual cell ID, a bandwidth part ID (BWP ID), or a slot interval.

5. The UE of claim 1, wherein the one or more processors are further configured to identify, at the UE, a length of a base sequence of a number of base sequences, and wherein the length of the base sequence is based on a coverage target level of the UE and is configured via radio resource control (RRC) signaling.

6. The UE of claim 1, wherein the one or more processors are further configured to identify, at the UE, the resource set for the WUS from one or more of:
   a starting position in frequency of the resource set,
   a bandwidth part (BWP) of the resource set,
   a density of the resource set,
   a bitmap of a frequency-domain location of the resource set,
   a higher-layer parameter of a time-domain location,
   one or more antenna ports for transmission of the WUS,
   one or more slot indices of the resource set, or
   one or more symbol indices of the resource set.

7. The UE of claim 1, wherein the resource set for the WUS is configured via radio resource control (RRC) signaling.

8. A base station operable for wake-up signal (WUS) communication in a wireless network, the base station comprising:
   one or more processors configured to:
      determine, at the base station, a resource set for a WUS, wherein the WUS includes a cell-specific sequence generated from a Zadoff-Chu (ZC) sequence with a Gold cover code sequence initialized by a UE-specific parameter using $g(n)=e^{-j\pi\mu n'(n'+1)/L_{ZC}}$ where $g(n)$ is the cell-specific sequence, $\mu$ is predetermined or configured via cell-specific signaling, n' is n mod $L_{zc}$, and $L_{zc}$ is a length of the ZC sequence;
      encode, at the base station for transmission to a user equipment (UE), the resource set for the WUS, wherein the WUS signals the UE to switch to a network access mode (NAM) from a power saving mode (PSM); and
   a memory interface configured to store the resource set for the WUS in a memory.

9. The base station of claim 8, wherein the one or more processors are further configured to select, at the base station, a repetition level of the resource set for the WUS based on a channel condition of the UE.

10. The base station of claim 8, wherein the WUS further includes a UE-specific sequence generated from a length-31 Gold sequence.

11. The base station of claim 8, wherein the WUS includes a UE-specific initialization of a UE-specific sequence, wherein the UE-specific initialization is based on one or more of: a cell radio network temporary identifier (C-RNTI), a physical cell identifier (ID), a virtual cell ID, a bandwidth part ID (BWP ID), or a slot interval.

12. The base station of claim 8, wherein the one or more processors are further configured to determine, at the base station, a length of a base sequence of a number of base sequences, wherein the length of the base sequence is based on a coverage level of the UE and is configured via radio resource control (RRC) signaling.

13. The base station of claim 8, wherein the resource set for the WUS is configured via radio resource control (RRC) signaling, wherein the resource set for the WUS is identifiable from one or more of:
    a starting position in frequency of the resource set,
    a bandwidth part (BWP) of the resource set,
    a density of the resource set,
    a bitmap of a frequency-domain location of the resource set,
    a higher-layer parameter of a time-domain location,
    one or more antenna ports for transmission of the WUS,
    one or more slot indices of the resource set, or
    one or more symbol indices of the resource set.

14. At least one non-transitory machine readable storage medium having instructions embodied thereon for wake-up signal (WUS) communication in a wireless network, the instructions when executed by one or more processors at a user equipment (UE) perform the following:
    identifying, at the UE, a resource set for a WUS, wherein the WUS includes a cell-specific sequence generated from a Zadoff-Chu (ZC) sequence with a Gold cover code sequence initialized by a UE-specific parameter using $g(n)=e^{-j\pi\mu n'(n'+1)/L_{ZC}}$, where $g(n)$ is the cell-specific sequence, $\mu$ is predetermined or configured via cell-specific signaling, n' is n mod $L_{zc}$ and $L_{zc}$ is a length of the ZC sequence;
    monitoring, at the UE, the resource set for the WUS;
    decoding, at the UE, a transmission received from a base station in the resource set for the WUS; and
    switching, at the UE, to a network access mode (NAM) from a power saving mode (PSM) based on a detection of the WUS in the resource set.

15. The at least one non-transitory machine readable storage medium of claim 14, further comprising instructions that when executed perform selecting, at the UE, a repetition level of the resource set for the WUS based on a channel condition of the UE.

16. The at least one non-transitory machine readable storage medium of claim 14, wherein the WUS further includes a UE-specific sequence generated from a length-31 Gold sequence.

17. The at least one non-transitory machine readable storage medium of claim 14, wherein the WUS includes a UE-specific initialization of a UE-specific sequence, wherein the UE-specific initialization is based on one or more of: a cell radio network temporary identifier (C-RNTI), a physical cell identifier (ID), a virtual cell ID, a bandwidth part ID (BWP ID), or a slot interval.

18. The at least one non-transitory machine readable storage medium of claim 14, further comprising instructions that when executed perform identifying, at the UE, a length of a base sequence of a number of base sequences, and wherein the length of the base sequence is based on a coverage target level of the UE and is configured via radio resource control (RRC) signaling.

19. The at least one non-transitory machine readable storage medium of claim 14, further comprising instructions that when executed perform identifying, at the UE, the resource set for the WUS from one or more of a starting position in frequency of the resource set, a bandwidth part (BWP) of the resource set, a density of the resource set, a bitmap of a frequency-domain location of the resource set, a higher-layer parameter of a time-domain location, one or more antenna ports for transmission of the WUS, one or more slot indices of the resource set, or one or more symbol indices of the resource set.

20. The at least one non-transitory machine readable storage medium of claim 14, wherein the resource set for the WUS is configured via radio resource control (RRC) signaling.

* * * * *